United States Patent Office 3,031,377
Patented Apr. 24, 1962

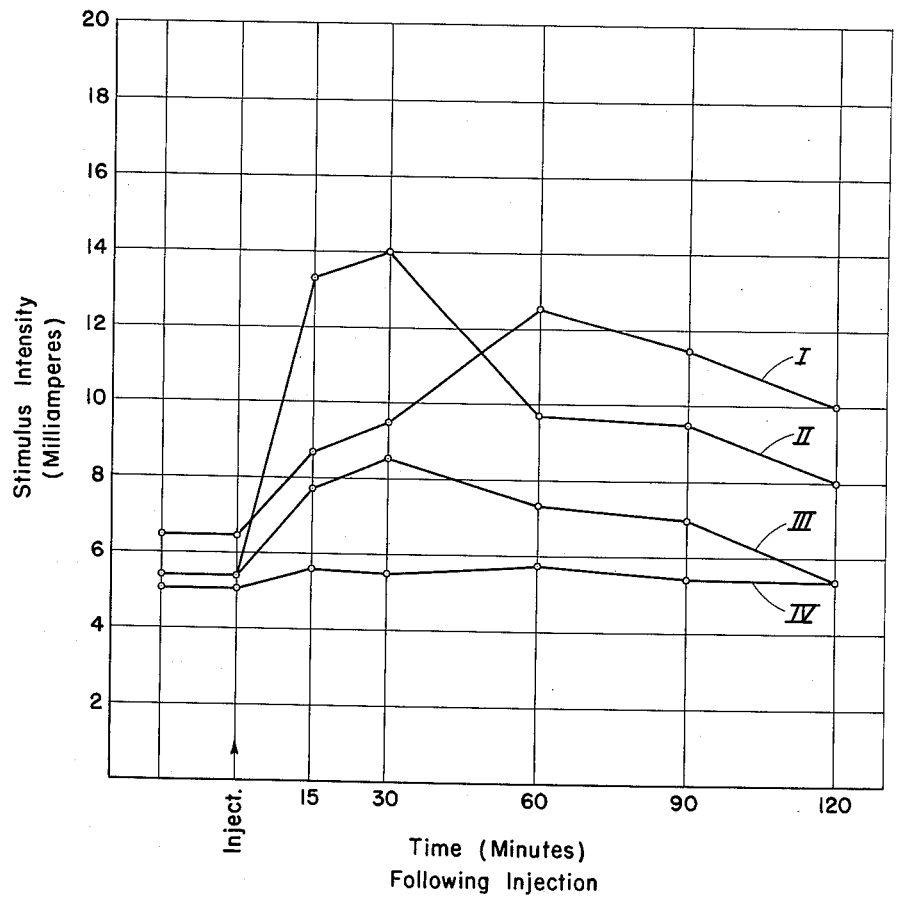

3,031,377
1-O-CHLOROPHENYL - 1 - PHENYL-3-DIMETHYL-AMINO-PROPANOL-1 ANTITUSSIVE PROCESS AND COMPOSITIONS
Rudolf Lorenz, Rudolf Gösswald, and Hans Henecka, Wuppertal-Elberfeld, Germany, assignors, by mesne assignments, to Farbenfabriken Bayer Aktiengesellschaft, a corporation of Germany
Filed Nov. 26, 1957, Ser. No. 699,084
8 Claims. (Cl. 167—65)

This invention relates, in general, to a novel chemical compound and to compositions of matter containing the same which are useful as antitussive agents. More particularly, the invention contemplates the provision of the new compound, 1-o-chlorophenyl-1-phenyl-3-dimethylaminopropanol-1, as represented by the structural formula:

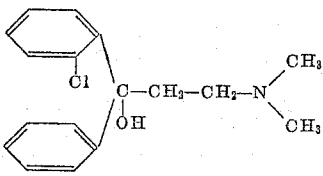

as well as novel therapeutic compositions containing this compound as the active ingredient, and improved processes for the treatment of tussive disturbances in warm-blooded animals involving administration of the compound and compositions of the invention.

Heretofore, highly active alkaloids belonging to the morphine series as, for example, acetylmorphine, codeine, dihydrocodeinone, acetylhydrocodeinone, etc., have been used predominantly for the treatment of coughs. While such compounds are effective for the purpose intended, their continued use in patients with chronic cough may produce tolerance to the drug, so that the individual dosage level has to be increased in order to achieve the desired therapeutic effect. Furthermore, the use of morphine preparations in emotionally unstable patients may induce addiction to the drug. Most of these drugs, moreover, produce some side effects such as depression of respiration, nausea, cramping, and hypnotic symptoms. Synthetic morphine-like substances possess similar disadvantages. Codeine and dihydrocodeine, for example, which are particularly susceptible to addiction are additionally objectionable for the reason that they usually cause constipation when administered in therapeutically effective doses.

The present invention is based on our discovery that the novel compound depicted above possesses pronounced antitussive or cough-relieving properties, but is largely free of undesirable side effects.

The compound of the invention may be produced by reacting o-chlorobenzophenone with acetonitrile in the presence of sodium amide or another strongly basic condensing agent, to form the nitrile of β-phenyl-β-o-chlorophenyl-hydracrylic acid, which is then hydrogenated to yield 1-phenyl-1-o-chlorophenyl-3-aminopropanol-1. The latter intermediate compound is subsequently dimethylated to provide the desired end-product 1-o-chlorophenyl-1-phenyl-3-dimethylaminopropanol-1.

In its application as an antitussive preparation, the compound of the invention may be employed directly in the form of the free base or as a salt, such as the hydrochloride, phosphate, maleate, etc. The active agent may be prepared for oral administration in the form of tablets, capsules, powders, solutions, syrups, troches, and the like, with any of the conventional additions. Thus, in the preparation of tablets, capsules and powders the active agent is combined predominantly with solids and/or tableting adjuvants such as lactose, starch, magnesium stearate, etc. In a similar manner, solutions may be prepared by combining the active agent with any of the conventional ingestible solvents, and with flavoring agents if necessary or desirable. The active agent can be candied and flavored in accordance with conventional methods, and provided in the form of relatively slowly dissolving troches or cough drops. In any event, the concentration of the active agent in these preparations should be such as to provide from about 100 micrograms to 500 micrograms of active agent per kilogram of body weight, on a unit dosage basis.

The following recipes are typical of the many various types of antitussive preparations which can be formed with the compound of the invention. In all instances, the active agent present in the preparations is 1-o-chlorophenyl - 1 - phenyl - 3 - dimethylaminopropanol - 1 hydrochloride.

(A) Liquid cough medicine:

| | Grams |
|---|---|
| Active agent | 5.00 |
| Glycerol (conc.) | 50.00 |
| Ethanol (90% by volume) | 40.00 |
| Distilled water, qs. 100.00 ml. | |

Forty drops (1 milliliter) of the foregoing solution contain 50 milligrams of the active antitussive agent of the invention.

(B) Cough syrup:

| | Grams |
|---|---|
| Active agent | 1.00 |
| Glycerol (conc.) | 30.00 |
| Rubi idaci syrup, qs. 100.00 ml. | |

(C) Cough elixir:

| | |
|---|---|
| Active agent | 1.00 |
| Ethanol (90% by volume) | 20.00 |
| Vanillin | 0.05 |
| Cherry syrup | 50.00 |
| Distilled water, qs. 100.00 ml. | |

(D) Suppositories:

| | |
|---|---|
| Active agent | 0.05 |
| Cocoa butter | 2.00 |

(E) Tablets:

| | |
|---|---|
| Active agent | 0.020 |
| Lactose | 0.020 |
| Talcum | 0.005 |
| Starch | 0.054 |
| Magnesium stearate | 0.001 |
| | 0.100 |

It is believed that the invention may be best understood by reference to the following pharmacological data obtained in actual tests conducted with the antitussive agent of the invention on various warm-blooded animals, including humans, and the experimental data presented hereinafter which illustrate a typical synthesis of the compound of the invention. The pharmacological data should be viewed in conjunction with the accompanying drawing in which the single FIGURE illustrates, in graphic form, the comparative results obtained with the antitussive agent of the invention and certain known antitussives, in experiments conducted on dogs with vagus loops.

PHARMACOLOGICAL DATA (I) *Antitussive Activity—Guinea Pigs—Pressurized Citric Acid Spray*

In this test, guinea pigs were placed in a cylindrical glass vessel and exposed to a citric acid spray under a pressure of 300 mm. Hg. The procedure is an adaptation of the method of Drimmer (Am. J. Med. Sci. 228; 156-163; 1954), which he devised for testing human volunteers. Ninety percent of the animals will respond within about two minutes with at least one cough, which is clearly discernible to observers via a loudspeaker connected to a microphone positioned within the test cylinder. The test substances were administered to the guinea pigs either orally or subcutaneously. A complete suppression of cough in fifty percent of the animals during an experimental period of two minutes was considered a positive test ($D_e$ 50).

In preparing the animals for testing, the compound of the invention, in the form of the hydrochloride salt in aqueous solution, was administered either subcutaneously or orally. For purposes of comparison, narcotine, (+)-3-methoxy-N-methylmorphinan hydrobromide, and codeine were similarly administered to separate animals.

The results of these tests are shown in tabulated form in Table I below. These data indicate that the antitussive agent of the invention is definitely superior in action to narcotine and is almost as effective as codeine.

Table I further includes a comparative showing of the relative toxicity of these agents on the basis of the average oral lethal dose ($LD_{50}$) in rats, and the equivalent average subcutaneous $LD_{50}$ in albino mice. The maximal effect was observed at the end of 30 minutes (subcutaneous injection) or 45 minutes (oral administration).

TABLE I

| | Preparation | $D_e$ 50 (oral), mg./kg. | $D_e$ 50 (s.c.), mg./kg. | Rat, $LD_{50}$ (oral), mg./kg. | Mouse, $LD_{50}$ (s.c.), mg./kg. |
|---|---|---|---|---|---|
| (a) | 1-o-chlorophenyl-1-phenyl-3-dimethylaminopropanol-1 hydrochloride. | 93 | 20 | 350 | 95 |
| (b) | narcotine hydrochloride | 175 | 41 | | 700 |
| (c) | (+)-3-methoxy-N-methyl-morphinan hydrobromide. | [1] nil | [1] nil | | 125 |
| (d) | codeine phosphate | 75 | 8.5 | 250 | 80 |

[1] Not sufficiently effective up to 100.

(II) Antitussive Activity—Dogs With Vagus Loops

In this test, dogs with vagus loops were used for testing the antitussive activity in unanesthetized dogs. The cough was produced by a modification of the method of Schroeder (Arch. exper. Path. Pharm. 212; 433–439; 1950–51), by electrical stimulation of the vagus loop for ten seconds using a Neuroton (Siemens) apparatus which produces well-defined square impulses. In control experiments, the threshold for production of the cough reflex ranged between 3–6 milliamperes at a frequency of 1–2 cycles per second.

Following administration of the antitussive drugs, the threshold was raised so that stronger stimuli were required to produce coughing. The stimulus could be increased by raising the current intensity (milliamperes). The relative effect obtained with a given antitussive drug could then be estimated from the current intensity and the length of time during which the cough threshold was elevated.

The results of these tests are illustrated in graphic form in the drawing. The curves show the increase in the threshold, and hence, the antitussive activity, of 1-o-chlorophenyl-1-phenyl-3-dimethylaminopropanol-1 hydrochloride (curve I) and of codeine (curve II) in equal subcutaneous doses of 2 mg./kg. body weight. The curve for narcotine (curve III) was obtained with a dosage level of 10 mg./kg. subcutaneously, and for (+)-3-methoxy-N-methylmorphinan hydrobromide (curve IV), with 2–10 mg./kg. subcutaneously. The animals were stimulated before injection, and again, 15, 30, 60, 90 and 120 minutes after injection. Each point on the curves represents an average value determined in from 4 to 8 animals for each substance and at each dosage level. It will be seen that the preparation of the invention provides about the same activity as codeine, while narcotine and (+)-3-methoxy-N-methylmorphinan hydrobromide are clearly inferior to these two substances.

(III) Antitussive Activity (Dogs) and Toxicity (General)

In a further series of tests, the compound of the invention and codeine were given orally (2 to 5 mg./kg.) to respective dogs by means of a stomach tube. It was found that under the same test conditions described in subdivision II above, the aqueous 0.2 percent solutions of the compound of the invention and of codeine phosphate gave antitussive activities of the same order of magnitude.

In a preliminary series of experiments, it was found that oral doses of codeine as low as 2 mg./kg. produced retching in dogs, while oral doses of 5 mg./kg. produced vomiting. The compound of the invention did not produce such effects with either of the doses specified. These findings demonstrate that our compound is better tolerated than codeine. This fact is further illustrated by the tabulated data set forth below, which compare the acute toxicities of 1-o-chlorophenyl-1-phenyl-3-dimethylaminopropanol-1 and codeine. For the more highly organized species in particular, the compound of the invention possesses a lower toxicity than codeine.

TABLE II

| Animal species and route of administration | Compounds | |
|---|---|---|
| | 1-o-chlorophenyl-1-phenyl-3-dimethylaminopropanol-1 (mg./kg.) | Codeine (mg./kg.) |
| Mouse (i.v.) $LD_{50}$ | 70 | 78. |
| Guinea pig (s.c.) Lethal dose | 130 | 120. |
| Rabbit (s.c.) Lethal dose | >50 | 40. |
| Cat (oral) Lethal dose | 80 | [1] 32 reported. 50. |

[1] Eddy, Journal Pharmacol. and exper. Therap. 67, 127, 1939.

(IV) Toxicity—Cats

The compound of the invention was administered to three cats at a dosage level of 5 mg./kg. orally for 21 workdays, and it was found that this chronic administration produced no particular symptoms of intolerance. The animals were sacrificed and autopsied 14 days after the last dose had been administered and were found to be in good nutritional condition. Macroscopically, the organs appeared normal. Histologic examination of liver, kidneys, adrenals, lung and spleen (hematoxylin-eosin stain following formalin fixation) disclosed no particular pathologic conditions.

(V) Constipation Effect—White Mice

The known constipating effect of codeine and dihydrocodeine (the latter being recommended for the treatment of diarrhea in infants and young children) was again observed in white mice receiving 25–50 mg./kg. of the drugs by mouth. Codeine causes a significant reduction in the number of fecal pellets as compared with control animals treated with physiological saline. When the mice received an equal dose of the antitussive compound of the invention, the excretion of feces was not reduced; if anything, it was slightly stimulated.

(VI) Antitussive Activity—Humans

Clinical trials were conducted with a number of human volunteers suffering from bronchitis and persistent coughs. These tests demonstrated that the antitussive of the invention produces pronounced effects when used in the form of a five percent solution (1 cc.=40 drops) at a dosage of 3 times 20–35 drops daily. The patients' dyspnea improved and no symptoms of intolerance were reported.

The following example describes the preparation of the compound of the invention.

EXAMPLE

To a suspension of 330 grams of sodamide (moistened with toluene) in 1500 milliliters of absolute ether, a solution of 1080 grams of o-chlorobenzophenone and 350 grams of acetonitrile in 3500 milliliters of absolute ether, was gradually added dropwise, with stirring, such that the reaction temperature adjusted itself to 28–30° C. The reaction mixture was stirred for 12 to 15 hours at room temperature and was then added carefully to some ice water. The resulting solution was extracted 3 times with ether. The ether solution was washed with water, dried over $Na_2SO_4$, filtered, and finally concentrated. When 1 liter of petroleum ether was added, 1240 grams (96% of theoretical) of β-phenyl-β-o-chlorophenyl-hydroacrylonitrile (melting point 90–92° C.) precipitated.

Five hundred (500) grams of the nitrile prepared above were dissolved in 3 liters of methanol and hydrogenated in the presence of 50 grams of Raney cobalt at a temperature of 60–70° C. and a pressure of 80–85 ATM. Two moles of hydrogen were absorbed, and after separation of the methanolic solution from the catalyst, 450 grams of 1-o-chlorophenyl-1-phenyl-3-aminopropanol-1 of melting point 117° C. were obtained. Catalytic methylation (hydrogenation in the presence of 2.2 moles of formaldehyde in aqueous methanol with Raney nickel catalyst) yielded 450 grams of 1-o-chlorophenyl-1-phenyl-3-dimethylaminopropanol-1 of melting point 120° C. The hydrochloride has the melting point 186° C.

Having thus described the subject matter of our invention, what it is desired to secure by Letters Patent is:

1. A therapeutic composition for the treatment of tussive disturbances within warm-blooded animals that comprises a pharmaceutical carrier, and an antitussive agent selected from the group consisting of 1-o-chlorophenyl-1-phenyl-3-dimethylaminopropanol-1 and pharmacologically acceptable acid addition salts of the same, said antitussive agent being present in a concentration sufficient to provide, on a unit dosage basis, from 100 to 500 micrograms of said agent per kilogram of body weight.

2. A therapeutic composition for the treatment of tussive disturbances within warm-blooded animals that comprises a solid pharmaceutical carrier, and an antitussive agent selected from the group consisting of 1-o-chlorophenyl-1-phenyl-3-dimethylaminopropanol-1 and pharmacologically acceptable acid addition salts of the same, said antitussive agent being present in a concentration sufficeint to provide, on a unit dosage basis, from 100 to 500 micrograms of said agent per kilogram of body weight.

3. A therapeutic composition for the treatment of tussive disturbances within warm-blooded animals that comprises a liquid pharmaceutical carrier, and an antitussive agent selected from the group consisting of 1-o-chlorophenyl-1-phenyl-3-dimethylaminopropanol-1 and pharmacologically acceptable acid addition salts of the same, said antitussive agent being present in a concentration sufficient to provide, on a unit dosage basis, from 100 to 500 micrograms of said agent per kilogram of body weight.

4. Process for the treatment of tussive disturbances within warm-blooded animals that comprises administering to the afflicted host a compound selected from the group consisting of 1-o-chlorophenyl-1-phenyl-3-dimethylaminopropanol-1 and pharmacologically acceptable acid addition salts of the same.

5. Process for the treatment of tussive disturbances within warm-blooded animals that comprises orally administering to the afflicted host a compound selected from the group consisting of 1-o-chlorophenyl-1-phenyl-3-dimethylaminopropanol-1 and pharmacologically acceptable acid addition salts of the same.

6. Process for the treatment of tussive disturbances within warm-blooded animals that comprises orally administering to the afflicted host a compound selected from the group consisting of 1-o-chlorophenyl-1-phenyl-3-dimethylaminopropanol-1 and pharmacologically acceptable acid addition salts of same in a unit dosage concentration within the range of from 100 to 500 micrograms of said compound per kilogram of body weight of the afflicted host.

7. A therapeutic composition for the treatment of tussive disturbances within warm-blooded animals that comprises an ingestible pharmaceutical carrier, and the antitussive agent 1-o-chlorophenyl-1-phenyl-3-dimethylaminopropanol-1, said antitussive agent being present in a concentration sufficient to provide, on a unit dosage basis, from 100 to 500 micrograms of said agent per kilogram of body weight.

8. A therapeutic composition for the treatment of tussive disturbances within warm-blooded animals that comprises an ingestible pharmaceutical carrier, and the antitussive agent 1-o-chlorophenyl-1-phenyl-3-dimethylaminopropanol-1 hydrochloride, said antitussive agent being present in a concentration sufficient to provide, on a unit dosage basis, from 100 to 500 micrograms of said agent per kilogram of body weight.

References Cited in the file of this patent

UNITED STATES PATENTS

| | | |
|---|---|---|
| 2,698,325 | Adamson | Dec. 28, 1954 |
| 2,827,460 | Stein et al. | Mar. 18, 1958 |

FOREIGN PATENTS

| | | |
|---|---|---|
| 624,118 | Great Britain | May 27, 1949 |
| 133,870 | Switzerland | Dec. 11, 1951 |

OTHER REFERENCES

Chem. Abst. (1), vol. 43, 1949, pp. 5417f, 6177g.
Chem. Abst. (2), vol. 45, 1951, pp. 1133i, 1134a.